(12) United States Patent
Fredette

(10) Patent No.: US 7,790,303 B2
(45) Date of Patent: Sep. 7, 2010

(54) STORAGE OF FUEL CELL ENERGY DURING STARTUP AND SHUTDOWN OR OTHER POWER TRANSITIONS

(75) Inventor: Steven J. Fredette, South Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 1332 days.

(21) Appl. No.: 11/274,240

(22) Filed: Nov. 14, 2005

(65) Prior Publication Data

US 2006/0068249 A1    Mar. 30, 2006

Related U.S. Application Data

(63) Continuation of application No. 10/669,273, filed on Sep. 23, 2003, now Pat. No. 6,991,864.

(51) Int. Cl.
*H01M 8/00* (2006.01)

(52) U.S. Cl. ............................................. 429/13; 429/22

(58) Field of Classification Search ................... 429/13, 429/21, 22
See application file for complete search history.

(56) References Cited

U.S. PATENT DOCUMENTS

| | | | |
|---|---|---|---|
| 6,572,993 B2 | 6/2003 | Singh et al. | |
| 6,858,335 B2 | 2/2005 | Schmidt et al. | |
| 2003/0077494 A1* | 4/2003 | Aberle et al. | 429/23 |
| 2003/0091882 A1* | 5/2003 | Schmidt et al. | 429/23 |
| 2004/0219399 A1 | 11/2004 | Zhu et al. | |
| 2005/0106432 A1 | 5/2005 | Converse et al. | |

\* cited by examiner

*Primary Examiner*—Patrick Ryan
*Assistant Examiner*—Ben Lewis
(74) *Attorney, Agent, or Firm*—M. P. Williams

(57) ABSTRACT

During fuel cell startup and shutdown or other power reduction transitions of a fuel cell power plant, the excess electric energy generated by consumption of reactants is extracted by a storage control (200) in response to a controller (185) as current applied to an energy storage system 201 (a battery). In a boost embodiment, an inductor (205) and a diode (209) connect one terminal (156) of the stack (151) of the battery. An electronic switch connects the juncture of the inductor and the diode to both the other terminal (155) of the stack and the battery. The switch is alternately gated on and off by a signal (212) from a controller (185) until sufficient energy is transferred from the stack to the battery. In a buck environment, the switch and the inductor (205) connect one terminal (156) of the stack to the battery. A diode connects the juncture of the switch with the inductor to the other terminal (155) of the fuel cell stack and the battery.

3 Claims, 4 Drawing Sheets

STORAGE OF FUEL CELL ENERGY DURING STARTUP AND SHUTDOWN OR OTHER POWER TRANSITIONS

CROSS REFERENCE TO RELATED APPLICATIONS

This application is a continuation of U.S. application Ser. No. 10/669,273, filed Sep. 23, 2003 now U.S. Pat. No. 6,991,864.

TECHNICAL FIELD

This invention relates to storing electrical energy extracted from a fuel cell stack during power reduction transitions, as an alternative to dissipating that energy in an auxiliary load or other resistive voltage limiting devices.

BACKGROUND ART

It has been known that corrosion of amorphous carbon catalyst supports and metal catalyst, which occurs during startup and shutdown of polymer electrolyte membrane (PEM) fuel cells, results in a permanent decay of fuel cell performance. It has also been known that the corrosion is due to a reverse current situation in which the cathode potential may be well in excess of one volt higher than the potential of a standard hydrogen electrode. It is believed that this is caused by both hydrogen and air being present at different locations within the anode flow field. During a shutdown period, unless an inert gas purge is used, air will slowly, uniformly fill both the anode and cathode flow fields of the fuel cell. During startup, hydrogen is fed to the anode flow field which results in the inlet to the anode flow field being primarily hydrogen while the exit of the anode flow field is primarily air. An electrochemical reaction occurs between the fuel rich zone in the anode flow field and the oxygen rich zone in the anode flow field that causes the potential of the anode in the oxygen rich zone to increase to the air open-circuit potential. This in turn raises the potential of the cathode, opposite to the air rich zone on the anode, to a potential of 1.4-1.8 volts versus a standard hydrogen electrode. This potential causes the carbon based catalyst support to corrode and results in decreased cell performance.

In U.S. Pat. No. 6,887,599, it is shown that as the fresh hydrogen-containing fuel flows through the anode flow field upon startup, to displace the air therein, the corrosion of the platinum catalyst and catalyst support occurs as the hydrogen/air interface moves through the anode flow field. The extent of corrosion is mitigated by rapidly purging the air with hydrogen during startup of the fuel cell. In a similar fashion, it is known that as purge air is passed through the anode upon shut-down, there is a hydrogen/oxygen interaction, which creates a potential safety hazard and may cause undesirably large voltage excursions in the cells, as described in U.S. Pat. No. 8,858,336.

In automotive applications, that may experience 50,000-100,000 startup/shutdown cycles, this results in catastrophic performance loss. Heretofore, solutions to this problem include stabilizing the fuel cell stack by purging the anode flow fields with an inert gas, such as nitrogen, and maintaining an auxiliary load across the fuel cell stack during the shutdown and startup processes.

In automotive applications, the availability of an inert gas, and the apparatus to employ it for purging will be prohibitively complex and expensive. The use of an auxiliary load requires dissipation of the heat generated thereby, which may typically occur in a reservoir of a water circulation system or a coolant system, or may occur with air cooling.

Referring now to FIG. 1, a vehicle 150 includes a fuel cell stack 151 comprising a plurality of contiguous fuel cells, each having a membrane electrode assembly (MEA) 16, only one fuel cell 12 being shown in FIG. 1. The electrical output at the positive and negative terminals of the fuel cell stack 151 is connected by a pair of lines 155, 156 through a switch 158 to a vehicle propulsion system 159. The output is also connected through a switch 160 to an auxiliary load 161 in a reservoir 164 of a water circulation system, the reservoir having a vent 165. The water circulation system may include a trim valve 166, water passages, such as those within water transport plates 84, 86, 88, 89, a radiator and fan 168, 169 which is selectively operable to cool water circulating in the system, and a water pump 170. Ambient air at an inlet 173 is provided by a pump, such as a blower 174, to the oxidant reactant gas flow fields of the cathode 19, and thence through a pressure regulating valve 175 to exhaust 176. Hydrogen is supplied from a source 179 through a flow regulating valve 180 to the fuel reactant gas flow fields of the anode 17, and thence through a pressure regulating valve 181 to exhaust 182. A fuel recycle loop includes a pump 183.

A controller 185 responds to load current determined by a current detector 186 as well as to the voltage across the lines 155, 156; it may also have temperature of the stack provided on a line 25 187. The controller, in turn, can control the valve 180 over a line 190 as well as controlling the other valves, the switches 158, 160 and the pumps 174, 170, as shown in FIG. 1.

The controller 185 responds to start and speed control signals from the vehicle propulsion system 159 on lines 193 and 194, which will indicate when the fuel cell should commence operation, and the amount of power being demanded by the vehicle propulsion system. Whenever a startup signal is sent from the vehicle propulsion system 159 over the line 193 to the controller 185, signals from the controller will cause the valves 180, 181 and the pump 183 to be operated appropriately so as to provide fuel reactant gas to the flow fields of the anode 17, and the valve 175 and pump 174 will be operated appropriately to provide ambient air to the flow fields of the cathode 19.

When fuel and air of sufficient quantity have been provided uniformly to the cells, open circuit voltage will be detected on the lines 155, 156 by the controller 185. At that time, the controller may close switch 160 so as to connect the fuel cell stack 151 to the auxiliary load 161 in the reservoir 164 and may also close the switch 158 so as to connect the fuel cell stack 151 to the vehicle propulsion system 159 at the same time, or later.

Whenever a shutdown signal is received from the vehicle propulsion system 159, the switch 160 will be closed so as to connect the auxiliary load 161, as the switch 158 is open so as to disconnect the vehicle from the fuel cell power plant.

DISCLOSURE OF INVENTION

Objects of the invention include: eliminating the need for an auxiliary load or other resistive voltage limiting device to control corrosion and performance decay in startup and shutdown or other power reduction transitions of fuel cell stacks; conserving energy in a fuel cell power plant; controlling fuel cell reactions during startup and shutdown or other power reduction transitions in a manner closely related to the then-present conditions; and making otherwise wasted energy available for use in a fuel cell power plant.

According to the present invention, during startup and shutdown or other power reduction transitions of a fuel cell stack, the spurious energy generated by the consumption of reactants therein is extracted in the form of electrical energy and stored in an energy storage device associated with the fuel cell power plant. In a boost configuration, useful when the voltage of the fuel cell stack is lower than the voltage at which it is desired to store energy in the energy storage device, an electronic switch causes current to build up in an inductor, and when the switch is gated off, the current continues to flow through a unilaterally conducting device into the energy storage system. In a buck configuration which is useful when the voltage of the stack is greater than the voltage at which energy is to be stored in the energy storage system, one electrical output terminal of the stack is connected through an electronic switch and an inductor to one side of the energy storage device, a second electrical output terminal of the fuel cell stack being connected to the other side of the energy storage system; a unilaterally conducting device extends from the second terminal to the juncture of the electronic switch and the inductor; when startup or shutdown is to occur, the electronic switch is first gated on causing current to flow directly through the inductor into the energy storage system; then the electronic switch is gated off and current continues to flow through the unilaterally conductive device and the inductor into the energy storage system.

During startup, this process is repeated for a given period of time, or until the DC current stabilizes at a specified level, or until a specific amount of energy is transferred. During shutdown or other power reduction transitions, this process is repeated until the voltage decays below a specified level (the energy in the fuel cell is dissipated).

In accordance further with the invention, in an electric vehicle powered by a fuel cell power plant, the energy storage system is a battery which is utilized for regenerative braking by the electric vehicle. The energy storage system is generally only charged to about 80% of its capacity to allow for regenerative braking, and to permit storing the energy of the fuel cell stack as a consequence of startup and shutdown or other reduction transitions.

Configurations other than those described above (and to be described in more detail hereinafter) may be utilized to practice the invention. Such configurations may include the use of isolation transformers, and various power electronics topologies, such as buck-boost, push-pull, forward, and flyback. Various switching devices may also be utilized to practice the invention.

The invention avoids the need for dissipation of heat, avoids the need for auxiliary loads or other voltage limiting devices, and is easily programmable to suit current operating conditions, which are different during startup than they are from shutdown, and to suit other operational variables.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
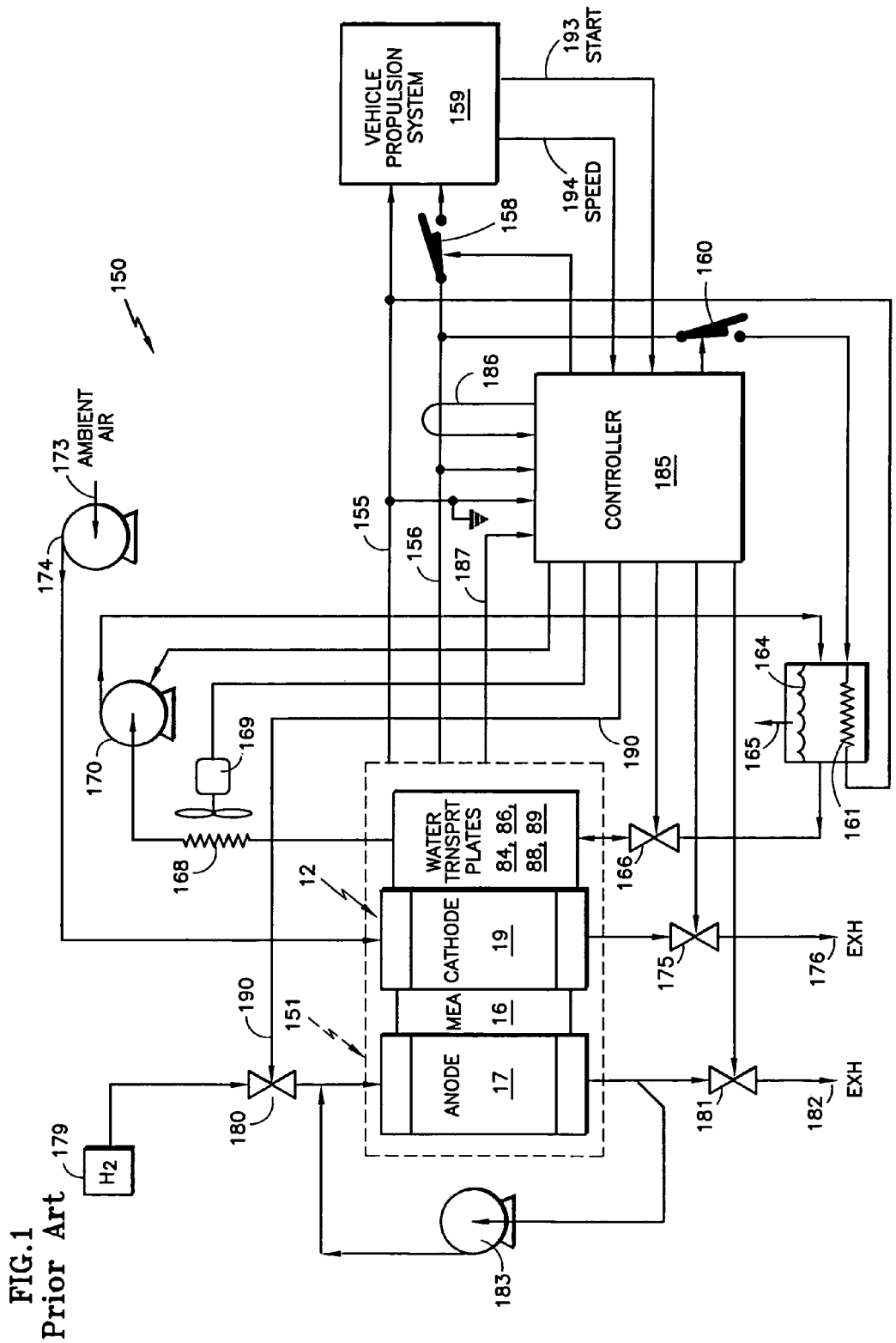
FIG. 1 is a schematic block diagram of a fuel cell power plant known to the prior art, utilizing an auxiliary load for startup and shutdown.
Figure 2:
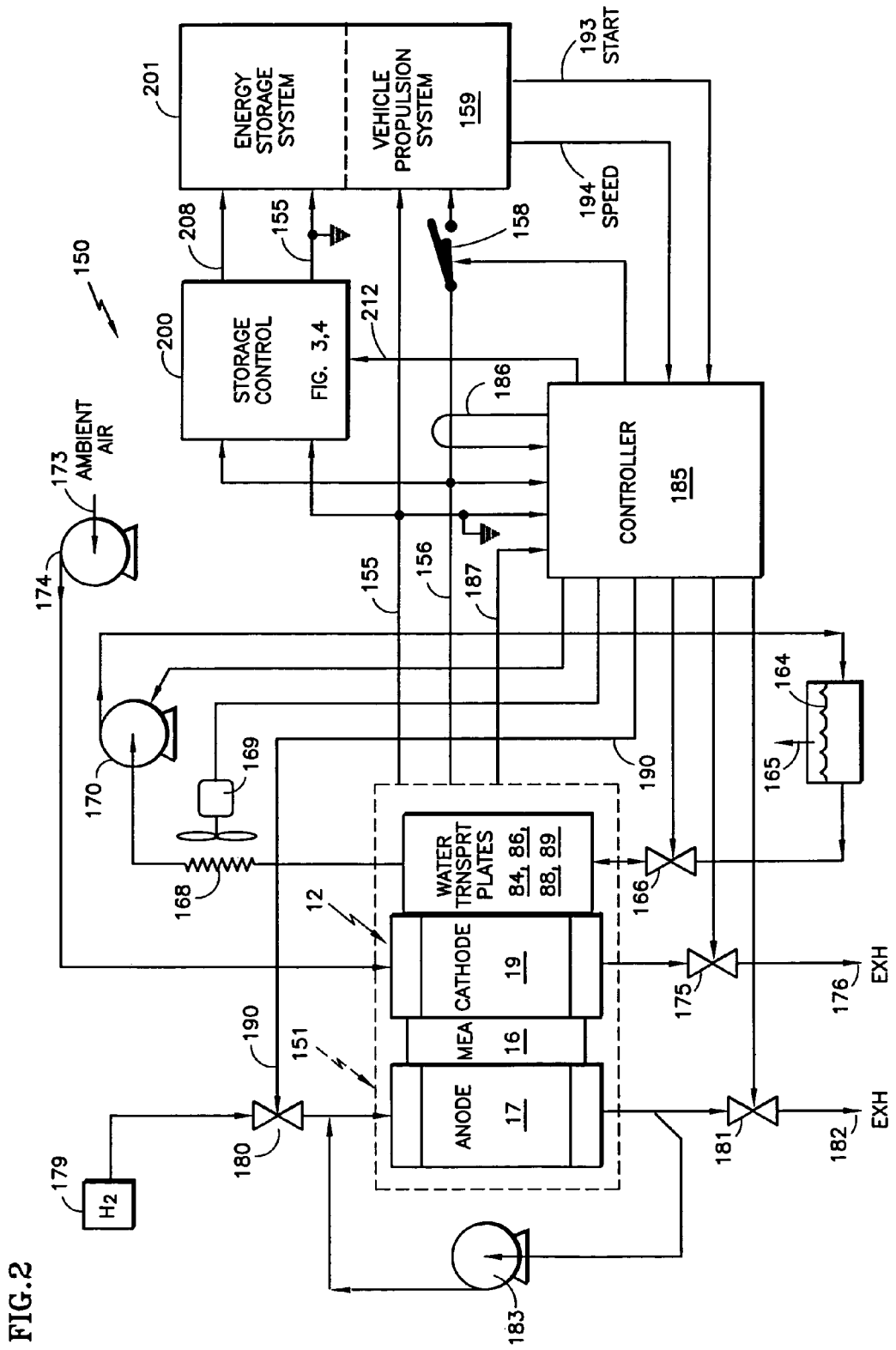
FIG. 2 is a schematic block diagram of a fuel cell power plant that stores the energy of a fuel cell stack in an energy storage system, during startup and shutdown or other power reduction transitions, in accordance with the invention.

Referring to FIG. 2, an auxiliary load (161, FIG. 1) is not utilized. Instead, a storage control 200 extracts the energy stored in the fuel cell stack, during startup and shutdown or other power reduction transitions, and applies it to an energy storage system 201, which in the present embodiment is the battery of an electric vehicle which is powered by the vehicle propulsion system 159. In other embodiments, the energy storage system 201 may be some other battery, it may be a capacitor, or it may be some other electrical storage device.

Figures 3, 4, 5:
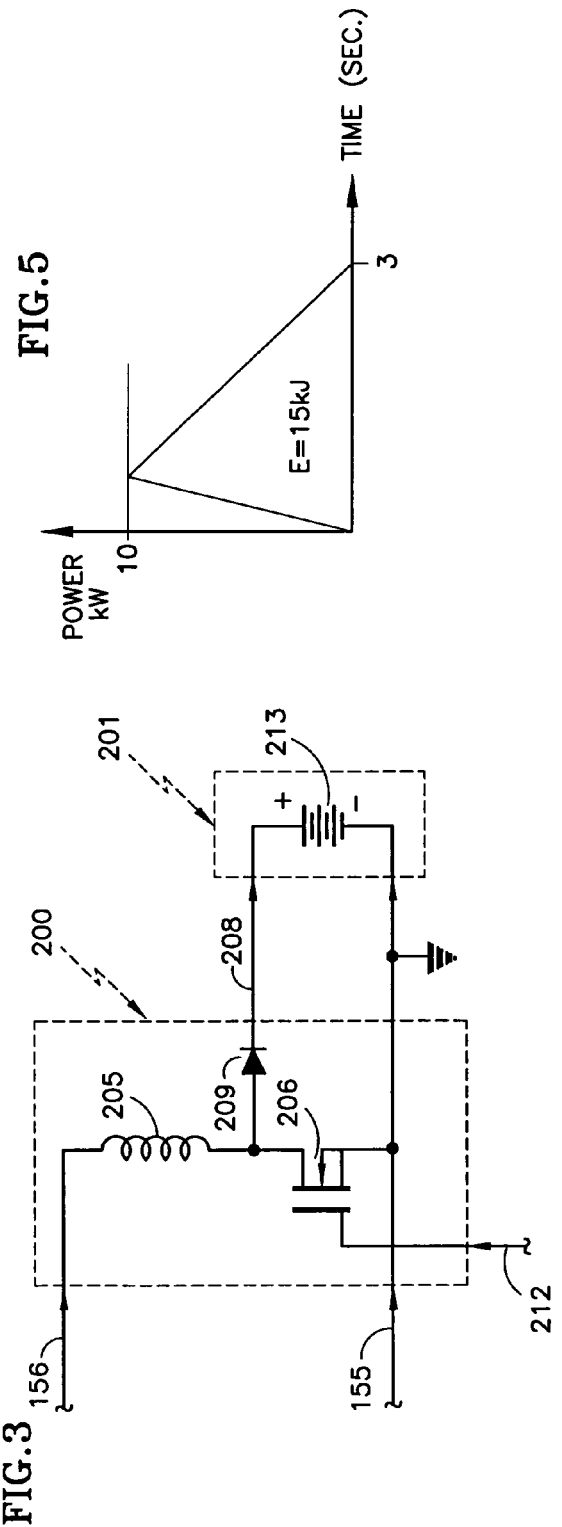
FIGS. 3 and 4 are schematic diagrams of a boost configuration storage control and a buck configuration storage control, for implementing the invention.
FIGS. 5 and 6 are graphs of power versus time.

The storage control 200 may take the form shown in FIG. 3, which is a boost configuration useful when the voltage output of the stack is lower than the voltage at which energy is to be stored in the energy storage system. In FIG. 3, an inductor 205 is connected in series with an electronic switch 206, which may be an insulated gate bipolar transistor, as shown, or any other suitable electronic switch, between the electric output terminals 155, 156 of the fuel cell stack 151.

The output of the storage control on a line 208 is taken from the juncture of the inductor and the switch through a unilaterally conducting device such as a diode 209. In order to transfer energy from the cell stack 151 when the output voltage thereof is less than the voltage at which the energy is to be stored in the ESS, the switch 206 is first gated on by a signal on a line 212 from the controller 185 (FIG. 2), so a current builds up in the inductor 205. After a time, the switch 206 is gated off and the current in the inductor will continue to flow through the diode 209 and the output line 208 into the energy storage system 201 (FIG. 2), which may be a battery 213. The current through the output line 208 (and the other terminal 155 of the fuel cell stack) is stored in the energy storage system 201. When energy leaves the fuel cell stack, in the form of current, the voltage in the fuel cell stack will decrease. This process is continued until the desired energy has been extracted from the fuel cell stack.

As an example of the energy relationship, FIG. 5 illustrates that the amount of energy to be transferred from the fuel cell stack can be calculated by plotting the output of the fuel cell stack, the transferred energy being represented by the area of the curve. The amount of energy is represented by the integrated power versus time that is generated by the fuel cell stack during a start or stop transition. In this example, the energy, E, is equal to 15 kiloJoules and the power is dissipated in three seconds.

Figure 6:
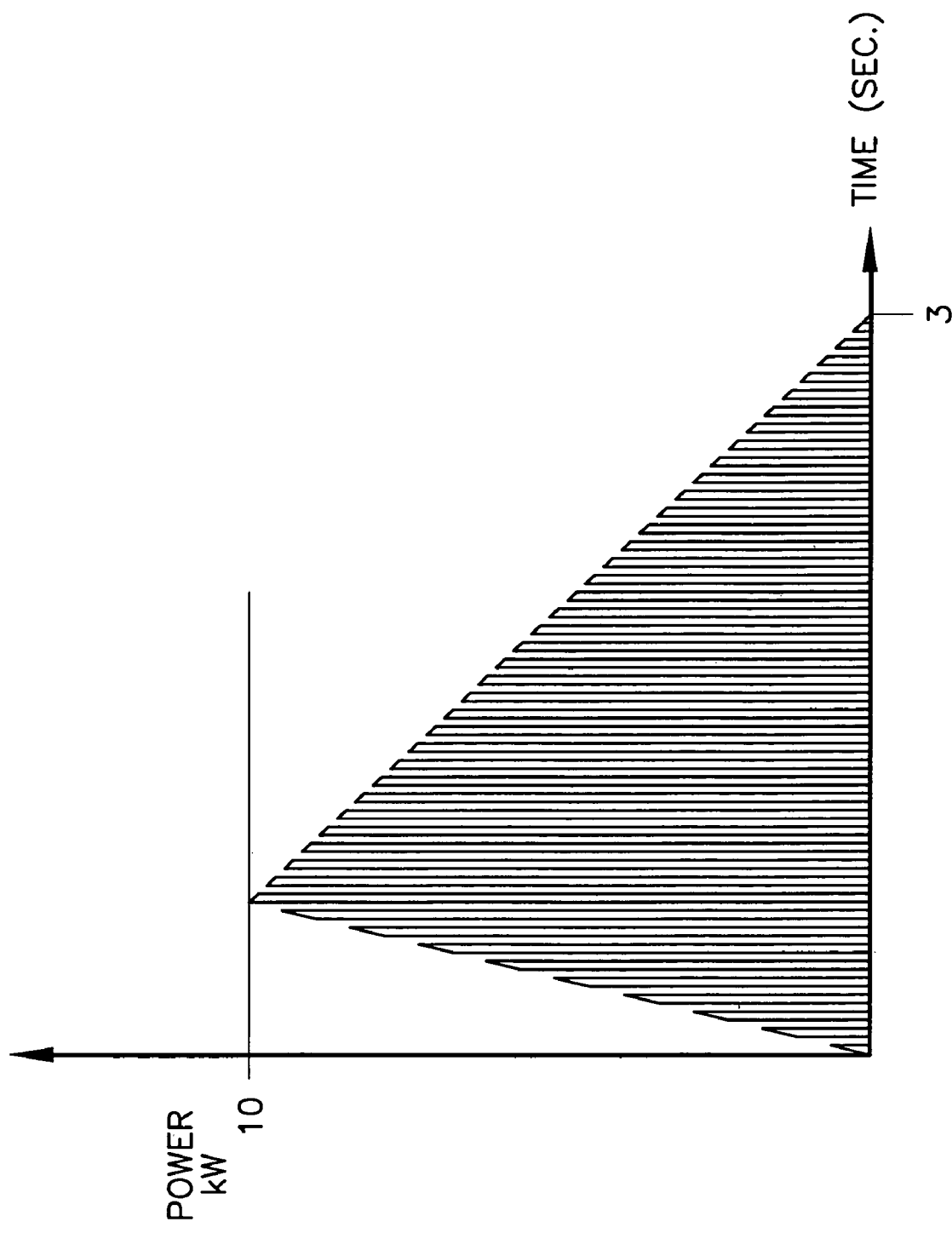

According to the invention, the energy is not taken out uniformly, as can be seen in FIG. 5. Instead, the transfer of power quickly reaches a maximum, and then decreases with respect to time. In the configurations described with respect to FIGS. 3 and 4, the energy is transferred in increments, as the switch 206 is gated on and off, as is illustrated in FIG. 6.

In FIG. 4, the switch 206 is in series with the inductor 205 between one electrical terminal 156 of the fuel cell stack and the energy storage system (201, FIG. 1). The diode 209 is connected from the other electrical terminal 155 of the fuel cell stack to the juncture between the inductor 205 and the switch 206. In the buck configuration of FIG. 4, which is used when the voltage of the fuel cell stack is greater than the voltage at which energy is to be stored in the energy storage system, the switch 206 is gated on by a signal on the line 212 causing a current to flow from the terminal 156 through the inductor 205 and into the energy storage system over the output line 208. Then, the switch 206 is gated off, at which time current will flow through the diode 209 and the inductor 205 over the output line 208 to the energy storage system 201, which in this instance is illustrated as a capacitor 215. The current flow through the switch 206 and inductor 205 causes the voltage of the fuel cell stack to decrease. The switching process is repeated until the desired energy has been extracted from the fuel cell stack.

In the configurations of FIGS. 3 and 4, control over the switching of electronic switch 206 by the signal on the line 212 allows use of the invention both for startup and for shutdown or other power reduction transitions, wherein the energy requirements may differ between startup and shutdown and other power reduction transitions. The sizing of the components 205, 206, 209, will be determined to carry the maximum current required for startup/shutdown/power reduction.

Other configurations, particularly switching configurations may be utilized, including use of an isolation transformer which could step the voltage up or down, in dependence on the system in which the invention is used, the transformed current then rectified for storage in a capacitor or a battery, or other suitable storage system. In this embodiment, the storage system is electrical, but other storage systems may be utilized, including mechanical systems, such as fly wheels.

The aforementioned patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method for controlling a fuel cell power plant adapted to store energy in an energy storage system associated with said fuel cell power plant which is removed from an associated fuel cell stack during transition from being not operating to operating, and vice versa, or other power reductions, in response to a controller interconnected with said fuel cell stack and responsive to signals received by said controller to cause said fuel cell stack to start up and to cause said fuel cell stack to shut down or otherwise vary power output, said energy storage system responsive to electrical output provided thereto to store corresponding energy, said method comprising:

during a transition selected from (a) startup of said fuel cell power plant or (b) shutdown of said fuel cell power plant or other reduction of power supplied by said fuel cell power plant, extracting, in the form of electrical output, energy generated by said fuel cell stack, said electrical output being provided to said energy storage device, thereby limiting the maximum average voltage in the fuel cells of said fuel cell stack during said transition.

2. A method, comprising:

operating a fuel cell power plant adapted to store energy, which is removed from an associated fuel cell stack, in an energy storage system associated with said fuel cell power plant during transitions including transitions from being not operating to being operating, and vice versa, and power reduction transitions from a first level of power demanded by a load, to a second level of power demanded by said load, said second level being lower than said first level, said energy storage system responsive to electrical output provided thereto to store corresponding energy in response to a controller interconnected with said fuel cell stack and responsive to one or more signals received by said controller to cause said fuel cell stack to start up, or to shut down, or to provide power to said load in response to demand for power by said load, said method comprising:

during transitions including (a) startup of said fuel cell power plant, (b) shutdown of said fuel cell power plant, and (c) transition from providing power to said load at said first level to providing power to said load at said second level, providing to said energy storage device at least a portion of the energy generated by said fuel cell stack in the form of electrical power output which is in excess of any power demanded by said load during any of said transitions, thereby limiting the maximum average voltage in the fuel cells of said fuel cell stack during any of said transitions.

3. A method, comprising:

operating a fuel cell power plant to store energy in an energy storage system associated with said fuel cell power plant which is removed from an associated fuel cell stack during a power reduction transition, from a first level of power demanded by a load to a second level of power demanded by said load, said second level being lower than said first level, in response to a controller interconnected with said fuel cell stack and responsive to one or more signals received by said controller to cause said fuel cell stack to provide power to said load in response to demand for power by said load, said energy storage system responsive to electrical output provided thereto to store corresponding energy, said method comprising:

providing to said energy storage device, during a transition from providing power to said load at said first level to providing power to said load at said second level, at least a portion of the energy generated by said fuel cell stack in the form of electrical power output which is in excess of the power demanded by said load, thereby limiting the maximum average voltage in the fuel cells of said fuel cell stack during said transition.

* * * * *